United States Patent [19]
Magill

[11] 3,883,918
[45] May 20, 1975

[54] TELESCOPIC CONNECTION FOR THE PROXIMATE END OF AN AIRPORT PASSENGER BRIDGE

[76] Inventor: John W. Magill, 664 N. Michigan Ave., Chicago, Ill. 60611

[22] Filed: Jan. 14, 1974

[21] Appl. No.: 433,006

Related U.S. Application Data
[63] Continuation-in-part of Ser. No. 396,716, Sept. 13, 1973.

[52] U.S. Cl. ................................................ 14/71
[51] Int. Cl. .......................................... B65g 11/00
[58] Field of Search ........................................ 14/71

[56] References Cited
UNITED STATES PATENTS

| | | | |
|---|---|---|---|
| 2,688,761 | 9/1954 | Good | 14/71 |
| 3,047,891 | 8/1962 | Golde | 14/71 |
| 3,099,847 | 8/1963 | Lodjic | 14/71 |
| 3,110,048 | 11/1963 | Bolton | 14/71 |
| 3,369,264 | 2/1968 | Kurka | 14/71 |
| 3,462,784 | 8/1969 | Seipos | 14/71 |
| 3,683,440 | 8/1972 | Xenakis | 14/71 |
| 3,711,881 | 1/1973 | Chapman | 14/71 |
| 3,808,626 | 5/1974 | Magill | 14/71 |

*Primary Examiner*—Nile C. Byers, Jr.
*Attorney, Agent, or Firm*—Norman H. Gerlach

[57] ABSTRACT

A telescopic connection adapted for use in connection with the proximate end of a passenger bridge at an airport and serving so operatively to connect such end of the bridge to a doorway in the wall of the associated airport terminal building so that the effective or overall length of the bridge may be extended to accommodate aircraft of extremely large size. A fixed outer sheathe has its inner end in communication with the doorway, projects forwardly into the cargo loading zone on the outside of the terminal building, and telescopically receives therein an inner passenger bridge extension which communicates with the proximate end of the passenger bridge. Power-actuated means or mechanism serves to project the extension from, and to retract the extension into, the sheathe, thus bodily impelling the entire passenger bridge away from and toward the airport terminal building in order to vary its effective length.

1 Claim, 4 Drawing Figures

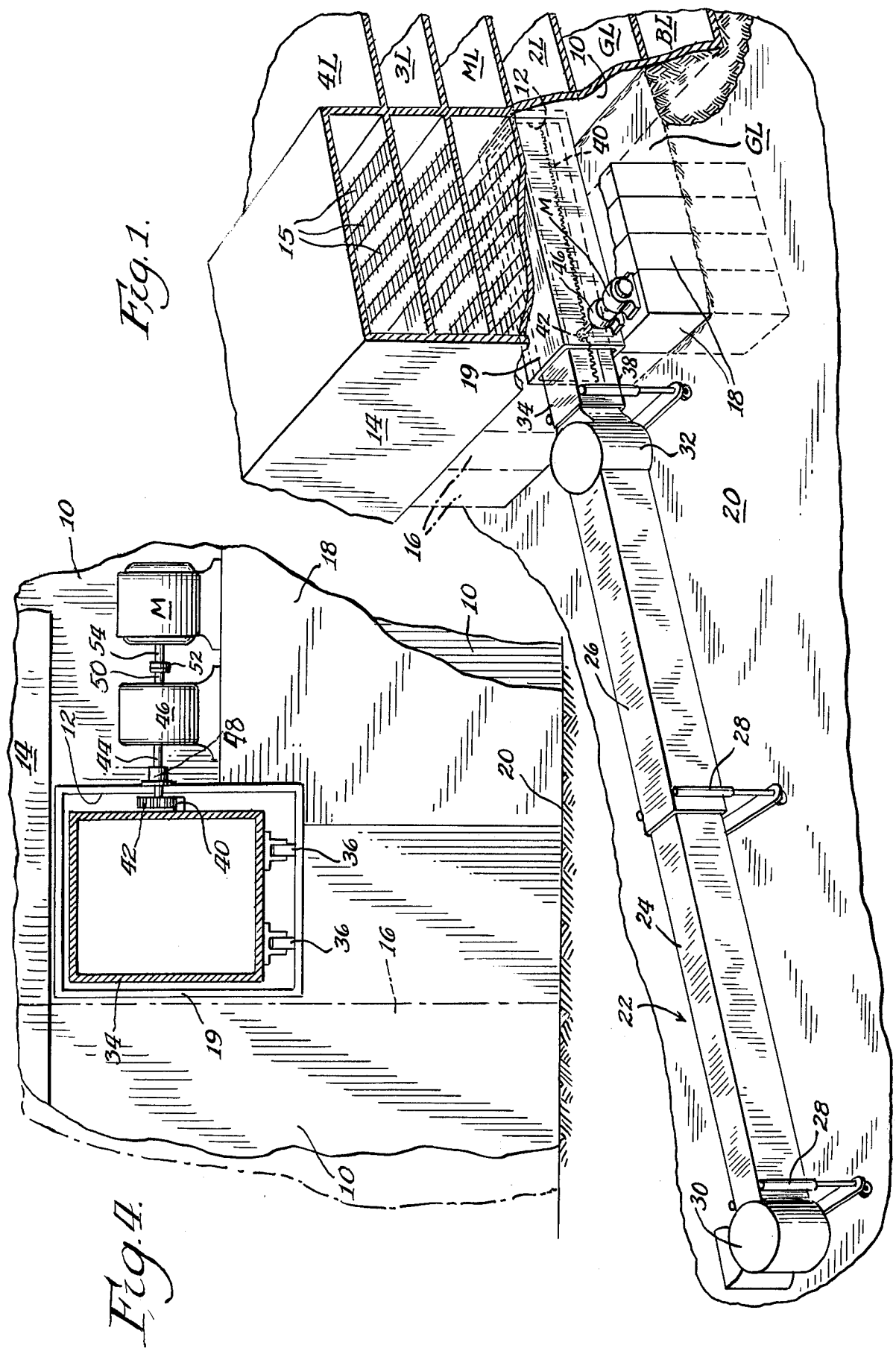

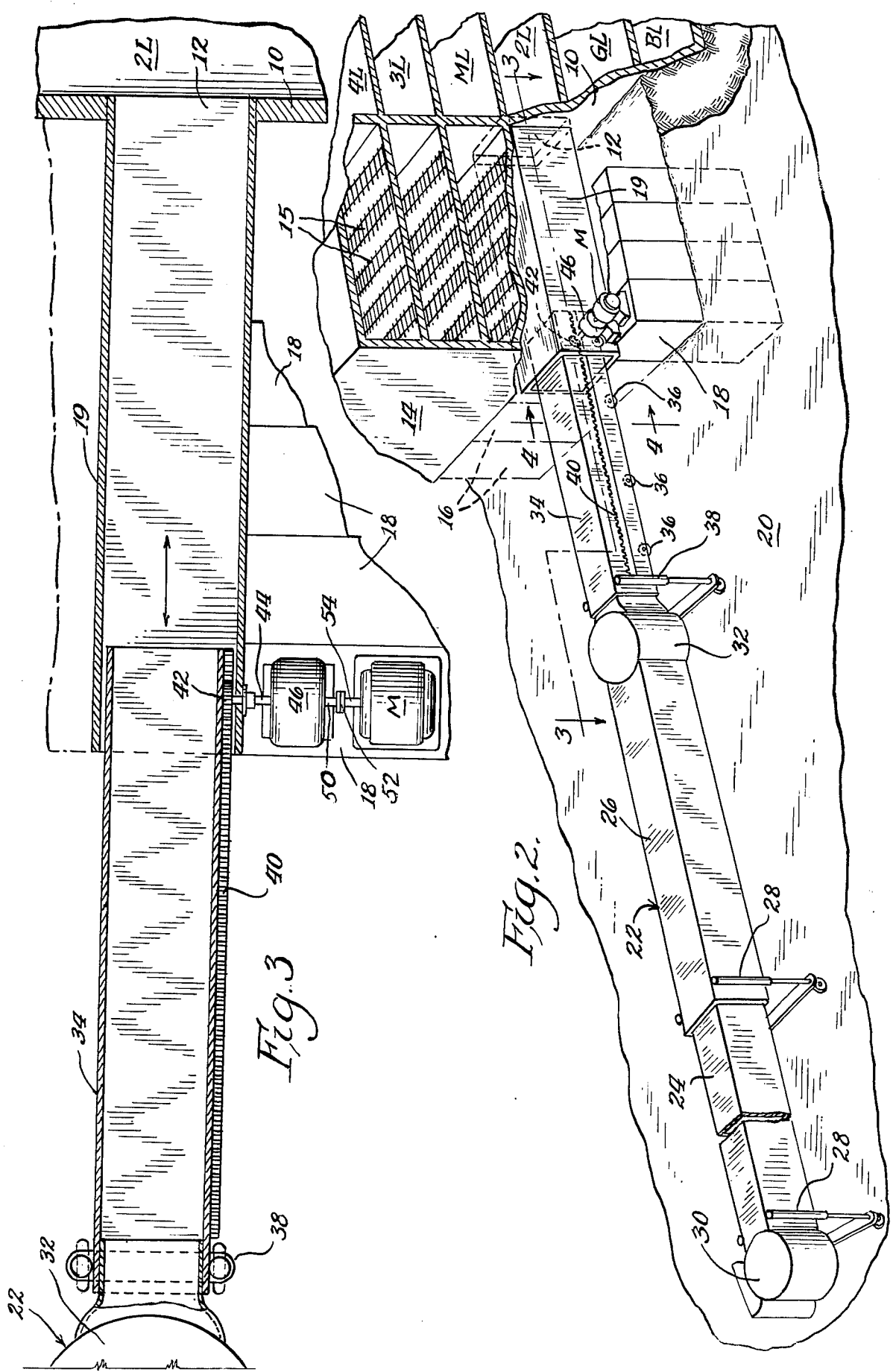

3,883,918

1

TELESCOPIC CONNECTION FOR THE PROXIMATE END OF AN AIRPORT PASSENGER BRIDGE

This patent application is a continuation-in-part of my co-pending U.S. Pat. application Ser. No. 396,716, filed on Sept. 13, 1973, and entitled INTEGRATED INDUSTRIAL AND URBAN AIRPORT COMPLEX WITH PASSENGER AND FREIGHT HANDLING FACILITIES.

The present invention relates generally to passenger bridges of the type which is commonly employed for establishing passenger communication between parked aircraft on the ramp area of an airport and a doorway of the terminal building of the airport. The invention is particularly concerned with a novel telescopic connection for the proximate end of such a passenger bridge, whereby the effective length of the passenger bridge may be extended to accommodate the additional length of an oversize aircraft.

In carrying out the invention, there is provided a fixed sheathe which projects outwardly from the doorway of the airport terminal building and telescopically receives therein an inner extension on the proximate end of the passenger bridge. In addition, there is provided an power-actuated means whereby such extension may be caused to slide outwardly and inwardly with respect to adjacent wall of the building. By such an arrangement, the outer sheathe and the inner passenger bridge extension constitute, in effect, a telescopic tunnel which operatively connects the proximate end of the passenger bridge to the doorway and thus increases the effective or over-all length of the passenger bridge at such time as the extension is partially or fully projected from its sheathe.

The present invention is essentially an improvement on certain corresponding structure which is shown and described in my aforementioned copending U.S. Pat. application Ser. No. 396,716.

In the aforesaid copending patent application, there is disclosed an airport terminal building embodying a plurality of passenger doorways from which there extend outwardly a series of closed, comparatively short covered passages. Each of these passages communicates at its outer end with a conventional telescopic passenger bridge having a pivoted vestibule at its inner or proximate end. Such vestibule constitutes a hinge connection for the passenger bridge as a whole, the bridge being effectively supported tractionally on the ground surface of the cargo loading zone which is outside of the terminal building of the airport. The vestibule thus enables the passenger bridge to be swung laterally in opposite directions in the usual manner of passenger bridge movement, to the end that the outer or distal end of the bridge may be connected directly to the passenger or cargo loading and unloading door which is ordinarily provided in front of the adjacent wing section of the aircraft to be serviced. Alternatively, the distal end of the passenger bridge may be connected to one end of a mobile passenger bridge, and the other end of the last mentioned bridge may be connected to the passenger or loading and unloading door which is provided behind adjacent wing section of aircraft to be serviced. Such a mobile passenger bridge constitutes the subject matter of may U.S. Pat. No. 3,808,626, granted on May 7, 1974, and entitled SELF-CONTAINED MOBILE PASSENGER BRIDGE FOR AIRPLANE LOADING AND UNLOADING OPERATIONS.

2

With the constantly increasing size of modern passenger jet aircraft, it has been found that present-day passenger bridges, if they are to serve their intended purposes for all arriving and departing aircraft, are inadequate to serve the latest elongated aircraft which have acquired the designation "stretch jets." With the advent of stretch jets which currently have reached a length of 200 feet or more, insofar as the fuselage is concerned, even the longest passenger bridges currently in use are unable to accommodate behine-the-wing exit and entrances doors. Sound engineering practice or design has dictated that in the design of elongated aircraft, there shall be approximately 2 feet of before-the-wing fuselage for every single foot of behind-the-wing fuselage, the wing span remaining substantially constant. Thus, with the longer stretch jets, although a given passenger bridge is capable of reaching from the terminal building to one of the before-the-wing doors of such aircraft, it is incapable of extending to a behind-the-wing location where it may be operatively coupled to a mobile passenger bridge of the type shown and described in my aforementioned U.S. Pat. No. 3,808,626. It has been estimated that within the next 10 years, stretch jets having an over-all fuselage length of 350 feet and capable of transporting from 750 to 1,000 passengers will be in use. Designs for such elongated aircraft are already being made. It is obvious that present-day passenger bridges are inadequate to accommodate such aircraft of the future. It is also obvious that in order to accommodate such elongated aircraft as have been briefly outlined above, a logical solution would be simply to increase the length of any passenger bridge which is to accommodate aircraft of unusually long length. This, however, would not only be costly but also it would render current passenger bridges obsolete. Furthermore, with longer airport passenger bridges, more space within the cargo loading zone would be required to accommodate the longer bridges, thus resulting in congestion within the loading zone.

The present invention is designed to overcome the above-noted length limitations that are attendant upon the construction and use of present-day airport passenger bridges and, toward this end, the invention contemplates the provision of a novel variable length connection which is expressly designed for use at the proximate end of a conventional airport passenger bridge and by means of which such end of the bridge may be caused to communicate with a terminal building doorway in such a manner that, by varying the effective length of the connection, the passenger bridge may be projected outwardly away from the building doorway so that it will reach remote aircraft entrance or exit openings or, alternatively, extend to a behind-the-wing location where the connection may be secured to a mobile passenger bridge which, in turn, extends to a behind-the-wing aircraft entrance and exit opening. Briefly, in carrying out the invention, it is contemplated that such connection shall embody the short covered passage by means of which passengers enter and leave the airport terminal building when deplaning and enplaning, such passage constituting a feature of the airport terminal building which is shown and described in my aforementioned copending patent application Ser. No. 396,716. Telescopically and slidably received within this passage, according to the present invention, there is provided an inner tubular passage extension which is capable of assuming a fully retracted position within the passage or a substantially fully projected position, the effective length of the passage and its cooperating extension thus is a function of the extent of projection of the extension from the passage. This passage extension is adapted to have its outer end operatively applied to the usual hinged or pivoted vestibule which is provided at the proximate end of a conventional airport passenger bridge, the extension thus, in effect, also constituting an inner extension for the passenger bridge. Power-actuated mechanism is provided for regularly projecting and retracting the extension. In any position of the extension, deplaning passengers proceed first through the passenger bridge and then pass through the extension and its encompassing sheathe-like covered passageway directly into the airport terminal building throught the doorway with which such passageway is associated. Enplaning passengers proceed first through the passageway and its telescopically received extension and from thence they proceed through the passenger bridge and then enter the aircraft from the distal end of the passenger bridge.

Various means may be provided for projecting and retracting the aforementioned extension, one such means consisting of a rack and pinion drive mechanism, the pinion being driven under the control of a reversible electric motor. Other power-actuated means are contemplated as, for example, a hydraulic piston and cylinder arrangement.

The present invention, when employed in connection with an airport terminal building of the character set forth in my aforementioned copending patent application Ser. No. 396,716, is of particular advantage in that the aforementioned covered passage through which passengers proceed when deplaning and enplaning projects outwardly from the second floor level of the terminal building and is nested between certain groups of elevators which lie outside of the building. Thus a natural "pocket" is provided for such covered passage where, even though it projects forwardly or outwardly of the outer building wall, it does not interfere with or obstruct the movement of persons or machinery in the cargo loading zone just outside of the main building wall. The invention is thus particularly well adapted for use in connection with an airport terminal building which is constructed according to the principles set forth in said copending patent application Ser. No. 396,716, although under certain circumstances the invention may be found useful with other airport terminal buildings, particularly if minimal obstruction of cargo-handling space is not a serious consideration. Irrespective of the particular building to which the present invention may be applied, the essential features of the invention are at all times preserved.

Generally speaking the primary object of the invention is to provide a telescopic connection embodying the particular features and characteristics herein described. Other objects and advantages of the improved telescopic connection will be apparent from a consideration of the following detailed description.

The invention consists in the several novel features which are hereinafter described and are more particularly described by the claim at the conclusion hereof.

In the accompanying two sheets of drawings forming a part of this specification, one illustrative embodiment of the invention is shown.

In these drawings:

FIG. 1 is a fragmentary perspective view of a portion of the cargo loading zone directly outside of an airport terminal building, showing only a small fragmentary portion of the building wall in the vicinity of a doorway, and showing a conventional passenger bridge in position at the loading zone and operatively connected to the doorway for passenger enplaning and deplaning purposes by means of the telescopic connection of the present invention, such connection being illustrated in substantially its fully collapsed condition;

FIG. 2 is a fragmentary perspective view similar to FIG. 1 but showing the telescopic connection in its substantially fully projected position;

FIG. 3 is a horizontal sectional view taken substantially on the line 3—3 of FIG. 2; and FIG. 4 is a vertical transverse sectional view taken substantially on the line 4—4 of FIG. 2.

Referring now to the drawings in detail and in particular to FIG. 1, the reference numeral 10 represents a fragment of the outside wall of an airport terminal building of the general character shown and described in my aforementioned copending U.S. Pat. application Ser. No. 396,716. In the wall 10 is formed a rectangular doorway 12 through which aircraft passengers are adapted to pass when enplaning or deplaning. As set forth in my last mentioned patent application, the airport terminal building which is in effect represented by the wall 10 is constructed on five levels including a below grade level BL, a ground level GL, a second floor level 2L, a third floor level 3L and a fourth floor level 4L. The doorway 12 is disposed at the second floor level 2L. A mezzanine level ML of limited extent is provided above the peripheral region of the second floor level 21. Fragmentary portions of the aforementioned levels are illustrated in FIGS. 1 and 2. A rectangular tubular three-level track-supporting enclosure 14 extends around the building wall 10 exteriorly of the latter and supports three series or levels of tracks 15, these tracks being served by various banks of elevators 16 which project into the track passengeways within the enclosure 14. The enclosure 14 is disposed immediately above the level of the level of the doorway 12 and, substantially directly beneath the level of the doorway and exteriorly of the building wall 10, there is provided a bank of short elevators 18 which lead to the below grade level BL and serve other tracks 15 at such level. A short sheathed or covered passageway 19 extends outwardly from the coorway 12 and projects between the bank of elevators 18 and the track enclosure 14 thereabove.

The respective functions of these various building adjuncts, with the exception of the covered passageway 19, bear no direct relation to the present invention and, as a consequence, they will not be set forth herein. However, their existence, and particularly their presence in the vicinity of the doorway 12 at the second floor level 2L, does bear a relation to the invention and, consequently, such adjuncts have been illustrated in the accompanying drawings as an environment for the present invention.

Heretofore, it has been the practice, in order to facilitate passenger enplaning and deplaning operations upon arrival of an aircraft on the loading zone 20 which surrounds the airport terminal building, to connect the doorway 12 to a doorway of the aircraft by means of a conventional passenger bridge such as the bridge 22 of FIGS. 1 and 2 of the drawings. The particular passenger bridge which has been selected for use in connection with the present invention is of a well known type and embodies a pair of telescopic bridge sections including an outermost section 24 and an innermost section 26. These sections are variously tractionally supported on the ground by power-actuated piston and plunger type pylons 28 whereby the elevation of the bridge as a whole or the inclination thereof may be varied at will to accommodate aircraft doorways of varying height. The wheels of the pylons at the proximate end of the outermost section 24 of the bridge 22 are both dirigible and power-driven to the end that, by proper manipulation or control of them, they may be utilized to extend or retract the outermost section 24 with respect to the innermost section 26 or swing the bridge 22 as a whole laterally. At the distal end of the outermost section 24 there is provided an attachment vestibule 30 which is designed for operative connection to an aircraft doorway and, similarly, at the proximate end of the innermost section 26 there is provided a second attachment vestibule 32 by means of which the passenger bridge may be hingedly secured to an opening in the outer wall of the airport terminal building.

According to the present invention, instead of causing the vestibule 32 at the proximate end of the sectional passenger bridge 22 to be connected directly to the doorway 12 as is customary in connection with a conventional airport terminal building or of connecting such vestibule directly to the outer end of the short passageway 19 as is done in connection with the structure of my aforementioned copending patent application Ser. No. 396,716, a rigid extensible inner extension 34 is provided within the passageway 19 and the outer end of such extension is adapted to be connected to the vestibule 32 at the proximate end of the passenger bridge 22. The extension 34 in one respect may be regarded as an extension of the passageway 19, and in another respect it may be regarded as being an extension of the passenger bridge 22.

The extension 34 is rectangular in transverse cross section and thus conforms to the rectangular cross section of the passageway 19 and, as shown in FIG. 4, it is supported by means of rollers 36 the latter one mounted by way of suitable bradsets on the bottom wall of the extension 34 and are adapted to roll on the bottom wall of the passage 19, on the bottom wall of said passageway 19. The outer end region of the extension 34 is tractionally supported on the ground surface of the loading zone 20 by means of pylons 38 which may be similar to the pylons 28 which support the two sections of the passenger bridge 22. Thus, as the extension 34 is projected forwardly from the passageway 19 which contains it, the rollers 36 travel on the bottom wall of the passageway while the pylons 38 travel on the ground.

In order to project the extension 34 forwardly from the passageway 19 and to retract the same within the confines of the latter, a rack and pinion mechanism, including an elongated rack 40 and a cooperating pinion 42, is provided. The rack is fixedly secured to the outer surface of one side wall of the extension 34 approximately midway between the upper and lower edges thereof and extends horizontally therealong. The pinion 42 is mounted on one end of a horizontal output shaft 44 leading from a gear reduction device 46, the shaft being rotatably journalled in a bearing 48 which is carried by the adjacent side wall of the passageway 12. The gear reduction device 46 is provided with a horizontal input shaft 50 which is connected by means of a coupling 52 to the output shaft 54 of a reversible electric motor M. The motor M and the gear reduction device 46 are preferably mounted on the upper end of the bank of short elevators 18.

From the above description it will be apparent that when the motor M is driven in one direction, the pinion 42 will actuate the rack 40 in such a manner as to cause the extension 34 to be projected outwardly of the passageway 19 and that when the motor is reversedly driven, the rack 40 will be actuated in the opposite direction so as to cause retraction of the extension within the passageway.

For purposes of discussion herein, the covered passageway 19 may be regarded as an outer tubular sheathe, while the extension 34 may be regarded as an inner tubular passenger bridge extension, both the sheathe and extension defining a telescopic variable length passageway or connection through which passengers proceed when enplaning or deplaning. In actual practice, when the connection is employed in a terminal building installation of the type disclosed in my copending patent application Ser. No. 396,716, the outer end of the extension 34 may be permanently associated with the pivoted or hinged vestibule 32 of the passenger bridge 22 and the extension 34 maintained in its fully retracted position, in which case the passenger bridge considered in its entirety will be drawn inwardly so that its proximate end is close to the sheathe or passageway 19. In this position, the telescopic arrangement of the two sections 24 and 26 of the passenger bridge 22 will permit adjustment of the latter in the usual manner of bridge manipulation to accommodate passenger jets and other aircraft of moderate size. However, upon arrival of a so-called stretch jet of greatly elongated design, the passenger bridge 22 may readily be adapted to service such an aircraft by projecting the extension 34 outwardly of the sheathe or passageway 19, thus moving the entire passenger bridge 22 bodily away from the building wall 10 until such time as it is apparent that the distal vestibule 30 of such bridge will reach the aircraft doorway which is to be serviced. At that time the extension 34 will be maintained in a fixed position and the coupling between the vestibule 30 and the selected doorway of the aircraft will be made in the usual manner. When a behind-the-wing doorway of such a stretch jet is to be serviced, the extension 34 may be projected from the sheathe or passageway 19 until the vestibule 30 of the passenger bridge has passed beyond the wing of the aircraft, after which such vestibule may be connected to the selected aircraft doorway by means of a mobile passenger bridge of the general type shown and described in my aforementioned copending patent application Ser. No. 284,229, and also incidentally shown in my U.S. Pat. No. 3,808,626. In this latter instance the aircraft wing will be completely bypassed and there will be no over-the-wing connection between the aircraft doorway and the terminal building doorway.

The invention is not to be limited to the exact arrangement of parts shown in the accompanying drawings or described in this specification as various changes in the details of construction may be resorted to without departing from the spirit or scope of the invention. For example, although the present telescopic connection is shown and described herein as being specifically employed for connecting the doorway of an aircraft to a covered extension leading outwardly from the doorway 10 of a terminal building of the type disclosed in my copending application Ser. No. 396,716, it is within the purview of the invention that the connection may be adopted for use with an airport building of conventional construction where the building doorway is not provided with such an extension. In such an instance the tubular sheathe or covered passageway 19 may have its outer end flush with the doorway and it may project inwardly into the interior of the building. Such an installation will, however, consume valuable floor space within the building. Therefore, only insofar as the invention is particularly pointed out in the accompanying claim is the same to be limited.

Having thus described the invention, what I claim as new and desire to secure by Letters Patent is:

1. The combination with an outside wall of a multi-level airport terminal building having a ground floor level, a second floor level, and a mezzanine level, said wall projecting upwardly from the inside edge of an adjacent ground level cargo loading zone and having formed therein a rectangular passenger doorway in communication with the second floor level, and a tubular rectangular corridor-forming enclosure extending horizontally along and disposed outwards of said wall, positioned in overhanging relationship with respect to the cargo loading zone and in alignment with the space over the mezzanine level, and having a horizontal bottom wall disposed at mezzanine floor level and an outside vertical wall spaced forwardly of the building wall, of a telescopic connection for establishing two-way passenger communication between said doorway and the proximate end of an elongated passenger bridge which is tractionally supported on the ground in said cargo loading zone, said telescopic connection comprising a fixed outer sheathe in the form of a tubular tunnel-like passageway having its inner end in communication with said doorway and embodying horizontal top and bottom walls and vertical side walls, said sheathe closely directly underlying the corridor-forming enclosure and having its outer end terminating substantially in vertical alignment with the outer vertical wall of said corridor-forming enclosure, the bottom wall of the sheathe lying at second floor level, an inner movable tubular extension in the form of a tunnel-like passageway embodying horizontal top and bottom walls and vertical side walls, said extension being slidably disposed in telescopic fashion within said sheathe, having its outer end hingedly connected to the proximate end of said passenger bridge, and being movable between a retracted position wherein it is disposed substantially wholly within the confines of the sheathe and an advanced position wherein it is projected outwardly of the sheathe so that it is disposed for the major part thereof outwardly of the outside vertical wall of the corridor-forming enclosure, a series of antifriction rollers carried by said extension and designed for tractional engagement with the bottom wall of the tubular sheathe, an elongated toothed rack mounted on one vertical side wall of the extension and substantially midway between the upper and lower edges thereof, a stationary gear reduction device disposed exteriorly of the sheathe and having its output shaft projecting through an adjacent side wall of the latter, a stationary reversible electric motor having a drive shaft operatively connected to the input shaft of said gear reduction device, and a pair of telescopic pylons extending between the forward end region of the extension and the ground and having traction wheels at the lower ends thereof for tractionally supporting the outer end of the extension.

* * * * *